United States Patent [19]

Sugiura et al.

[11] Patent Number: 5,712,051
[45] Date of Patent: Jan. 27, 1998

[54] ELECTROLUMINESCENT DEVICE AND METHOD FOR FABRICATING SAME

[75] Inventors: Kazuhiko Sugiura, Nagoya; Masayuki Katayama, Handa; Nobuei Ito, Chiryu; Tadashi Hattori, Okazaki, all of Japan

[73] Assignee: Nippondenso Co., Ltd., Kariya, Japan

[21] Appl. No.: 531,384

[22] Filed: Sep. 21, 1995

[30] Foreign Application Priority Data

Sep. 22, 1994 [JP] Japan ................................ 6-254393

[51] Int. Cl.⁶ ............................................... H05B 33/00
[52] U.S. Cl. ........................ 428/690; 428/691; 428/917; 313/504
[58] Field of Search .......................... 428/690, 691, 428/917; 313/504

[56] References Cited

U.S. PATENT DOCUMENTS

| | | | |
|---|---|---|---|
| 5,309,070 | 5/1994 | Sun et al. | 313/503 |
| 5,505,986 | 4/1996 | Velthaus et al. | 427/66 |

FOREIGN PATENT DOCUMENTS

| | | |
|---|---|---|
| 2-72592 | 3/1990 | Japan . |
| 4-58158 | 9/1992 | Japan . |
| 5-65478 | 3/1993 | Japan . |

OTHER PUBLICATIONS

Barrow et al, "A new class of blue TFEL Phosphors with application to a VGA Full-color display" SID 93 Digest, 1993, pp. 761-764.

Barrow et al, "A high contrast, Full color, 32.256 Line TFEL Display", 1994 International Display Research Conference, 10-13 Oct. 1994: pp. 448-451.

*Primary Examiner*—Charles Nold
*Attorney, Agent, or Firm*—Cushman, Darby & Cushman IP Group of Pillsbury, Madison & Sutro LLP

[57] ABSTRACT

An electroluminescent device improved in brightness includes sequentially stacked layers having an optically transparent material on at least the viewing side of the structure and has a luminescent layer based on a Group II-III-VI compound host material with an element acting as a luminescent center added therein, wherein a Group II element having an ion radius differing from that of the Group II element constituting the compound host material is further added in the luminescent layer.

10 Claims, 5 Drawing Sheets

ELECTROLUMINESCENT DEVICE AND METHOD FOR FABRICATING SAME

CROSS REFERENCE TO RELATED APPLICATION

This application is based upon and claims the benefit of priority of the prior Japanese Patent Application No. 6-254393 filed on Sep. 22, 1994, the contents of which are incorporated herein by reference.

BACKGROUND OF THE INVENTION

1. Field of the Invention

The present invention relates to an electroluminescent device (referred to simply hereinafter as an "EL device") for use in, for example, emissive type segment displays and matrix displays of instruments, displays of various types of information terminal machines, and the like. The present invention also relates to a process for fabricating the EL device.

2. Related Art

EL devices fabricated heretofore utilize the light-emitting phenomenon of a luminescent layer. More specifically, it uses the light emission by applying an electric field to a luminescent layer comprising an element acting as a luminescent center in a host material based on a Group II-VIB compound such as zinc sulfide (ZnS). EL devices are attracting much attention as components for implementing an emissive type panel display.

A cross sectional view of the structure of a generally used EL display 10 is shown in FIG. 3.

In FIG. 3, the EL device 10 comprises a glass substrate 1 as an insulating substrate, having thereon sequentially stacked layers of a first transparent electrode (first electrode) 2 comprising an optically transparent ITO (indium tin oxide) film, etc.; a first insulating layer 3 comprising tantalum pentaoxide ($Ta_2O_5$), etc.; a luminescent layer 4; a second insulating layer 5 comprising tantalum pentaoxide ($Ta_2O_5$), etc.; and a second transparent electrode (second electrode) 6 comprising an optically transparent ITO film, etc.

An ITO film is a transparent electrically conductive film based on a tin(Sn)-doped indium oxide ($In_2O_3$), and it has been used widely as a transparent electrode.

The luminescent layer 4 may comprise zinc sulfide (ZnS) as a host material with an element such as manganese (Mn), terbium (Tb), or samarium (Sm) incorporated therein as a luminescent center. Otherwise, it may comprise strontium sulfide (SrS) as a host material with cerium (Ce) incorporated therein as the luminescent center.

The color of a light emitted by an EL device 10 depends on the combination of the host material and the element that is added as the luminescent center. Thus, in case of using zinc sulfide (ZnS) as the host material, an amber-emitting phosphor can be obtained by adding manganese (Mn) as a luminescent center; a green-emitting phosphor is realized by adding terbium (Tb), and a red-emitting phosphor is achieved by adding samarium (Sm). When strontium sulfide (SrS) is used as the host material, a blue-green emission can be obtained by adding cerium as the luminescent center. A blue-emitting phosphor can be obtained when cerium is added into calcium thiogallate ($CaGa_2S_4$), strontium thiogallate ($SrGa_2S_4$), or barium thiogallate ($BaGa_2S_4$).

An unexamined Japanese Patent Publication H5-65478, for instance, discloses the effect of the concentration of cerium in the luminescent layer and the quantity of adding gallium sulfide ($Ga_2S_3$) into the sputtering target on increasing brightness of a blue-emitting EL device utilizing calcium thiogallate ($CaGa_2S_4$), or strontium thiogallate ($SrGa_2S_4$). However, it was found that the brightness was still insufficient.

An EL device emits light when accelerated electrons collide with the luminescent center. More specifically, the electrons inside the luminescent layer or the electrons that are injected into the layer from the boundary between the luminescent layer and the insulating layer are accelerated by an AC voltage applied to the electrodes provided on both ends of the luminescent layer, and are collided against the luminescent center. Thus, the brightness can be increased with increasing number of electrons accelerated for exciting the luminescent center.

SUMMARY OF THE INVENTION

An object of the present invention is to increase the brightness of an EL device comprising a Group II-IIIB-VIB luminescent layer such as an alkaline earth thiogallate host material.

The present inventors have found that the electron density of the luminescent layer can be increased and that the brightness of an EL device can be thereby improved by adding into the alkaline earth thiogallate host material of the luminescent layer, an element belonging to the same Group as that of the element constituting the host material of the luminescent layer and which can be added relatively easily.

More specifically, the present invention provides an EL device comprising sequentially stacked layers having an optically transparent material on at least the viewing side of the structure, the electroluminescent device comprising a luminescent layer based on a Group II-IIIB-VIB compound host material with an element acting as a luminescent center added therein, characterized in that a Group II element having an ion radius differing from that of the Group II element constituting the compound host material is further added in the luminescent layer.

Preferably, the Group II element differing in ion radius as compared with the Group II element constituting the host material is added into the luminescent layer at a concentration of 0.01% by atomic or more but 10% by atomic or less with respect to the Group II element constituting the host material, and more preferably, at a concentration of from 0.01 to 5 atomic percent.

The ratio of the quantity of the added element acting as a luminescent center to the quantity of the added Group II element having an ion radius differing from that of the Group II element constituting the compound host material, i.e., (the quantity of the added element acting as a luminescent center)/(the quantity of the added Group II element having an ion radius differing from that of the Group II element constituting the compound host material) ratio, falls in a range of from 0.01 to 100 (0.01 and 100 included).

The raw material of the luminescent layer can be fabricated by applying heat treatment to a powder of a host material into which an element acting as a luminescent center and a Group II element having an ion radius differing from that of the Group II element constituting the host material are added; and forming a luminescent layer by means of sputtering or evaporation using the resulting powder or a target obtained by sintering the resulting powder.

Otherwise, the luminescent layer can be fabricated by supplying an element acting as a luminescent center and a Group II element having an ion radius differing from that of the Group II element constituting the host material, from a supply source differing from that for supplying the host material or the elements constituting the host material, by utilizing, for instance, multi-component sputtering, multi-component evaporation, metal organic chemical vapor deposition, or atomic layer epitaxy.

In the aspects of the present invention above, equivalent electron traps are formed within the band gap of the host material by adding a Group II element into the luminescent layer of an EL device, provided that said Group II element has an ion radius differing from that of the Group II element constituting the compound host material. Thus, on applying an electric field to the luminescent layer of the EL device, the electron density of the luminescent layer considerably increases by the electrons that are emitted from the equivalent electron traps to the conduction band, and the excitation efficiency of the luminescent center is improved by the accelerated electrons. Accordingly, the brightness and the emission efficiency of the EL device can be greatly increased.

BRIEF DESCRIPTION OF THE DRAWINGS

These and other objects, features and characteristics of the present invention will be appreciated from a study of the following detailed description, the appended claims, and drawings, all of which form a part of this application. In the drawings:

DETAILED DESCRIPTION OF THE PRESENTLY PREFERRED EXEMPLARY EMBODIMENTS

The present invention is described in further detail below referring to the preferred embodiments according to the present invention. It should be understood, however, that the present invention is not to be construed as being limited to the examples below.

[EXAMPLE 1]

Figure 1:
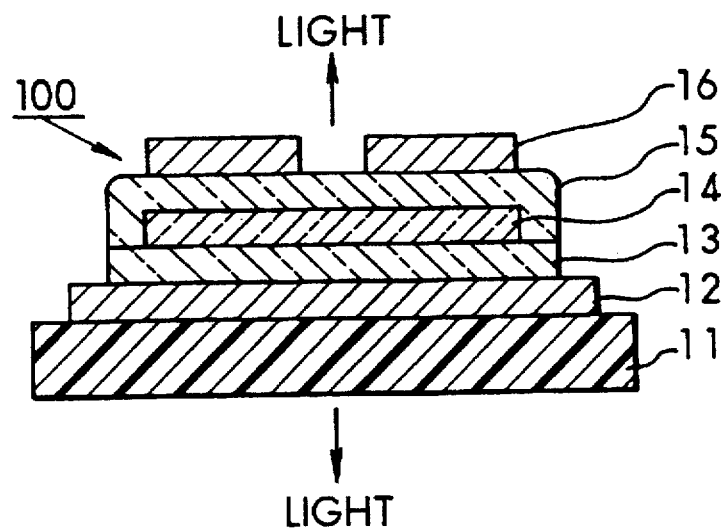
FIG. 1 is a schematically drawn cross sectional view of an EL device according to an embodiment of the present invention.
Figure 3:
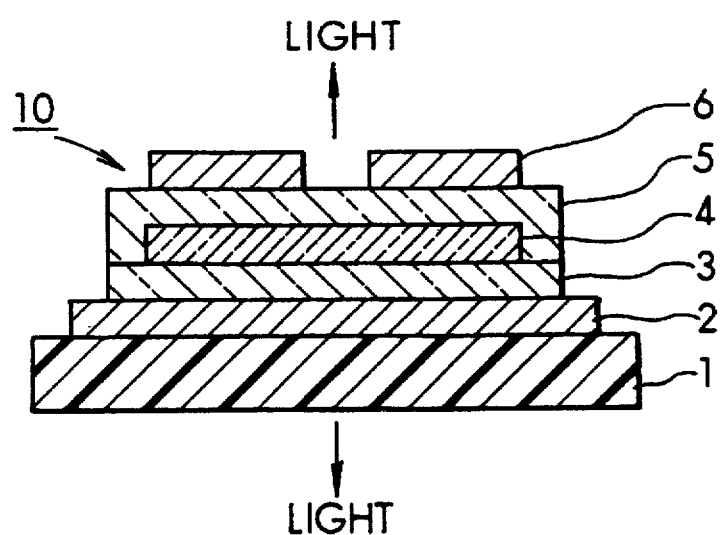
FIG. 3 is a schematically drawn cross sectional view of a conventional EL device.

FIG. 1 is a schematically drawn cross sectional view of an EL device 100 according to the present embodiment. For the EL device 100 in FIG. 1, light is emitted in the direction indicated with an arrow.

The EL device 100 comprises a glass substrate 11 as an insulating substrate having thereon sequentially stacked layers of thin films described below. In the description below, the film thickness is taken at the center of each layer.

In FIG. 1, the following stacked layers are sequentially deposited on the glass substrate 11 to provide the EL device 100: a first transparent electrode (first electrode) 12 based on an optically transparent zinc oxide (ZnO); a tantalum pentaoxide ($Ta_2O_5$) film as a first insulating layer 13; a calcium thiogallate ($CaGa_2S_4$) luminescent layer 14, which is doped with cerium (Ce) as a luminescent center, deposited by means of sputtering; a tantalum pentaoxide ($Ta_2O_5$) film as a second insulating layer 15; and an optically transparent zinc oxide (ZnO) film as a second transparent electrode (second electrode) 16.

The process for fabricating the EL device 100 is explained below.

The first transparent electrode 12 is deposited on the glass substrate 11 by using a pelletized target prepared by mixing a zinc oxide (ZnO) powder with gallium oxide ($Ga_2O_3$). The film deposition is effected by using an ion plating apparatus. More specifically, after evacuating the apparatus to vacuum, an argon (Ar) gas is introduced inside the apparatus to maintain the pressure constant, and the beam power as well as the high frequency power are controlled to deposit the film at a rate in a range of from 6 to 18 nm/min.

A first insulating layer 13 comprising tantalum pentaoxide ($Ta_2O_5$) and the like is formed on the first transparent electrode 12 by means of sputtering. More specifically, a mixed gas of argon (Ar) and oxygen ($O_2$) is introduced inside the sputtering apparatus while maintaining the temperature of the glass substrate 11 constant, and the film is deposited at a high frequency power of 1 kW.

A cerium-doped calcium thiogallate ($CaGa_2S_4$:Ce) luminescent layer, which comprises calcium thiogallate ($CaGa_2S_4$) as the host material, cerium (Ce) as the luminescent center, and magnesium (Mg) as an auxiliary Group II element having an ion radius differing from that of the main Group II element constituting the host material (i.e., calcium), is formed as a luminescent layer 14 by means of sputtering.

The ion radii of the Group II elements are, 0.32 Å for beryllium (Be), 0.65 Å for magnesium (Mg), 0.99 Å for calcium (Ca), 1.13 Å for strontium (Sr), 1.35 Å for barium (Ba), 0.74 Å for zinc (Zn), 0.97 Å for cadmium (Cd), and 1.10 Å for mercury (Hg).

More specifically, the luminescent layer 14 can be formed by introducing a mixed gas of argon (Ar) and 20% (with respect of argon) of hydrogen sulfide ($H_2S$) inside the sputtering apparatus while maintaining the temperature of the glass substrate 11 constant at room temperature, and then depositing the film at a high frequency power of 100 W.

On depositing the luminescent layer, a target of a powder was prepared by adding cerium fluoride ($CeF_3$) and magnesium sulfide (MgS) into calcium thiogallate ($CaGa_2S_4$) powder, and then heat treating the mixed powder at 900° C. for a duration of 3.5 hours in gaseous hydrogen sulfide ($H_2S$). The luminescent center element and the auxiliary Group II element having an ion diameter differing from that of the main Group II element constituting the host material can be efficiently added into the host material by thus applying heat treatment to the powder, because the additional elements substitute for calcium (Ca) constituting calcium thiogallate ($CaGa_2S_4$).

The concentration of cerium (Ce) and magnesium (Mg) in the deposited film must be controlled by adjusting the concentrations thereof in the target, because, even if a predetermined quantity of cerium and magnesium is added to the target, the sputtering yield of each element in the target is not the same.

The $CaGa_2S_4$:Ce luminescent layer 14 is crystallized thereafter by subjecting the layer to heat treatment at 650° C.

for a duration of 30 minutes because the as-deposited CaGa$_2$S$_4$:Ce luminescent layer 14 at room temperature is in an amorphous state.

After the heat treatment, each concentration of cerium and magnesium in the luminescent layer 14 is measured by means of electron probe X-ray microanalyzer (EPMA). Thus, cerium and magnesium were each found to be present in the luminescent layer 14 at a concentration of 0.26 atomic percent. Accordingly, the ratio of the quantity of added element acting as the luminescent center and that of the added auxiliary Group II element having an ion radius differing from that of the main Group II element constituting the compound host material is found to be 1.0.

A second insulating layer 15 comprising tantalum pentaoxide (Ta$_2$O$_5$) is deposited thereafter on the luminescent layer 14 in a manner similar to that described above for forming the first insulating layer 13, and a second transparent electrode 16 using zinc oxide (ZnO) film is formed on the second insulating layer 15 in a manner similar to that used above for the first transparent electrode 12.

Thus are obtained a first and a second transparent electrode each 300 nm in thickness, a first and a second insulating layer each 400 nm in thickness, and a luminescent layer 14 of 1,000 nm in thickness.

Figure 2:
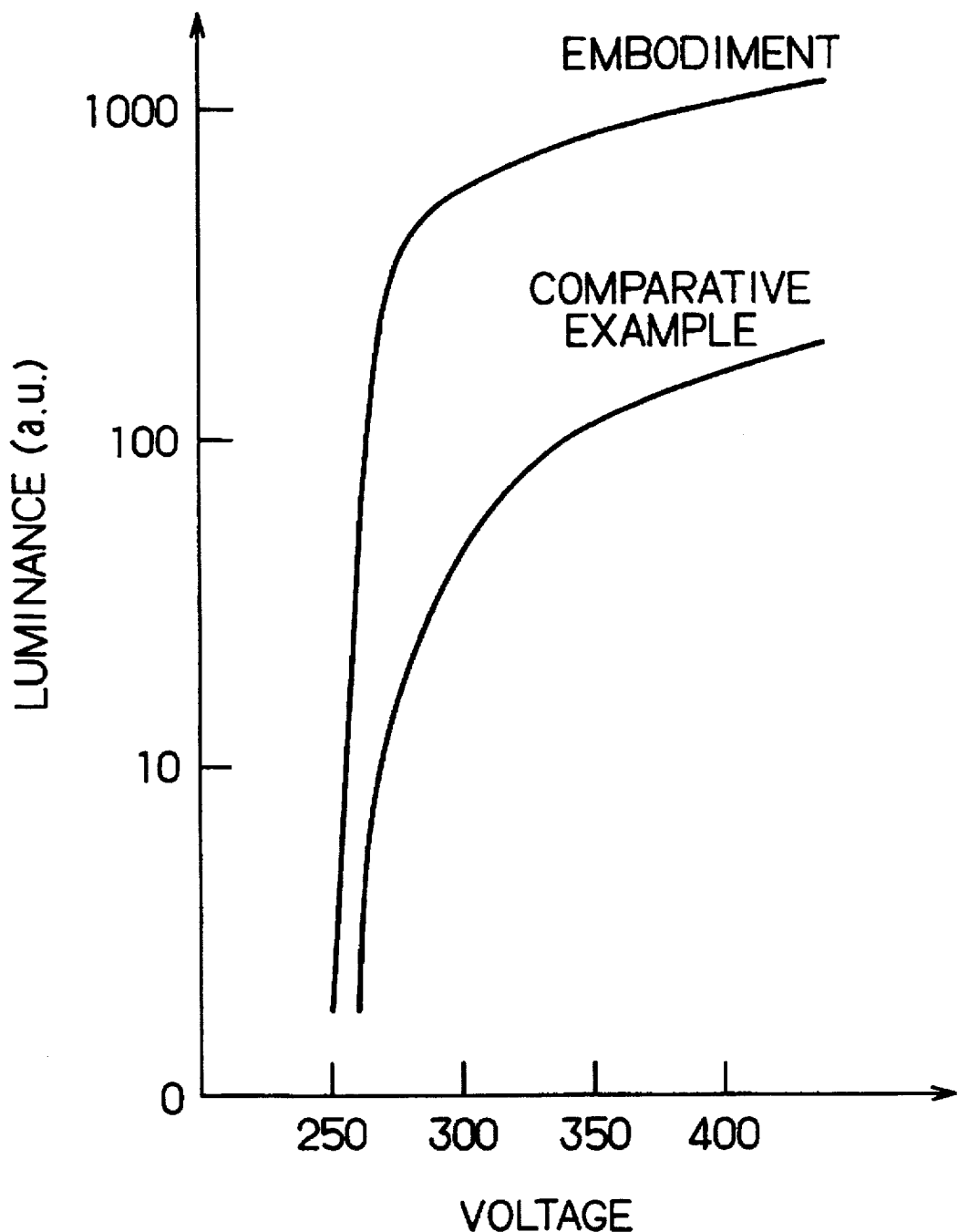
FIG. 2 is a graph showing a relation between the observed brightness and the applied voltage of an EL device according to an embodiment of the present invention, comprising a magnesium-doped luminescent layer.

FIG. 2 is a graph showing the luminance-voltage characteristics of an EL device according to the present embodiment comprising a luminescent layer 14 with magnesium (Mg) added therein as the auxiliary group II element. The EL device 100 is pulse-operated at 1 kHz and 40 μs.

The comparative example indicated in FIG. 2 relates to a device comprising a luminescent layer 14 having the same cerium concentration as that of the embodiment, except for adding no magnesium (Mg) in the luminescent layer 14.

It can be seen from the results in FIG. 2 that the brightness and the emission efficiency of the EL device 100 can be greatly increased by employing a constitution according to the present embodiment comprising a luminescent layer 14 into which an auxiliary Group II element having an ion radius differing from that of the main Group II element constituting the host material of the luminescent layer 14. Also, as can be seen from FIG. 2, according to the present embodiment, the starting voltage, which is necessary to start an emission of light, can be made lower than the comparative example.

Figure 4:
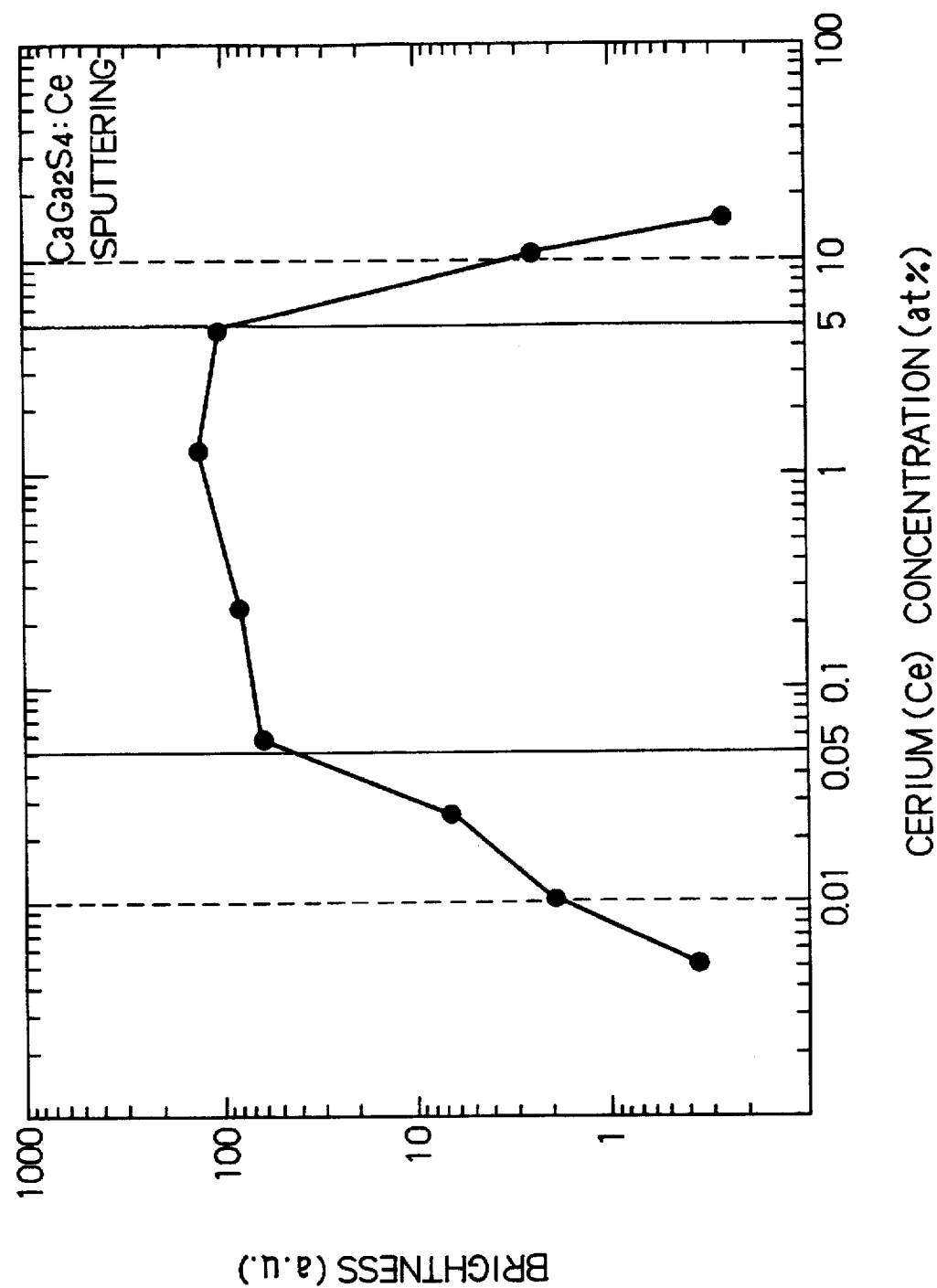
FIG. 4 is a graph showing a relation between the observed brightness and the cerium concentration of the luminescent layer.

FIG. 4 shows the relation between the brightness and the quantity of cerium added into the CaGa$_2$S$_4$ luminescent layer fabricated by means of sputtering, provided that no Group II element other than calcium is added. If the quantity of the element acting as a luminescent center in the luminescent layer 14 is too small, the luminance decreases. If the quantity of the luminescent center element is too large, the luminance and the emission efficiency become low due to the concentration extinction. Thus, the concentration of the element acting as a luminescent center is preferably in a range of from 0.01 to 10 atomic percent as shown in FIG. 4. More preferably, the concentration is in a range of from 0.05 to 5 atomic percent from the viewpoint of achieving particularly superior luminance and emission efficiency.

Figure 5:
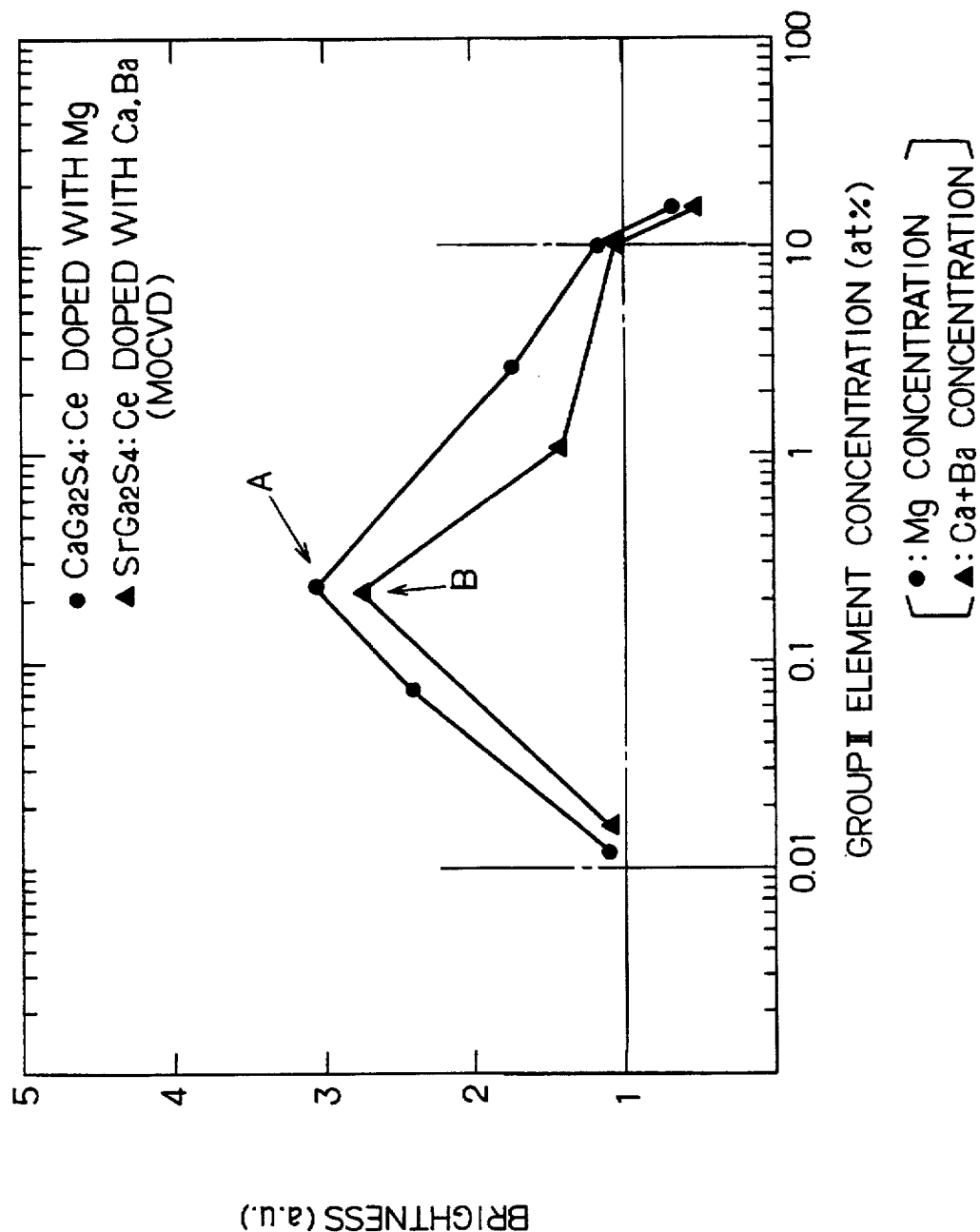
FIG. 5 is a graph showing a relation between the observed brightness and the concentration of a Group II element added into the host material.

FIG. 5 shows the relation between the brightness and the quantity of the auxiliary Group II element having an ion radius differing from that of the main Group II element constituting the host material. The brightness is expressed in relative unit by taking the luminance of the luminescent layer containing 0.13 atomic percent of cerium and no Group II element other than the element constituting the host material, i.e., calcium for the CaGa$_2$S$_4$:Ce(0.3 at. %) luminescent layer or strontium for the SrGa$_2$S$_4$:Ce(0.3 at. %) luminescent layer, as unity. Thus, it can be seen that the plots indicated with symbols A and B each show a luminance 3 times as high as that of the case having no additional Group II element ions. It can be understood from FIG. 5 that the quantity of an auxiliary Group II element added to the luminescent layer 14 must be optimally controlled. Thus, if the quantity of the added auxiliary Group II element is too small, the effect of the present embodiment not achieved. If the quantity of the added auxiliary Group II element is too large, on the other hand, the crystallinity of the luminescent layer becomes impaired. Accordingly, a preferred range of concentration for the auxiliary Group II element is from 0.01 to 10 atomic percent. More preferably, the concentration is in a range of from 0.05 to 5 atomic percent from the viewpoint of achieving particularly superior luminance and emission efficiency.

It can be seen from the foregoing that ratio r of the quantity of the element acting as a luminescent center added to the luminescent layer 14 to the quantity of the auxiliary Group II element, which has an ion radius differing from that of the Group II element constituting the host material of the luminescent layer 14, added to the luminescent layer 14 is 0.01 or higher but 100 or lower. That is to say, when the following expression is satisfied, the remarkable effect of the present embodiment can be obtained.

$$0.01 \leq r \,(=Q_{LC}/Q_{AUX}) \leq 100$$

wherein $Q_{LC}$ is the quantity of the added element acting as a luminescent center in the luminescent layer 14, and $Q_{AUX}$ is the quantity of the auxiliary Group II element added into the luminescent layer 14 and having an ion radius differing from that of the main Group II element constituting the host material.

Figure 6:
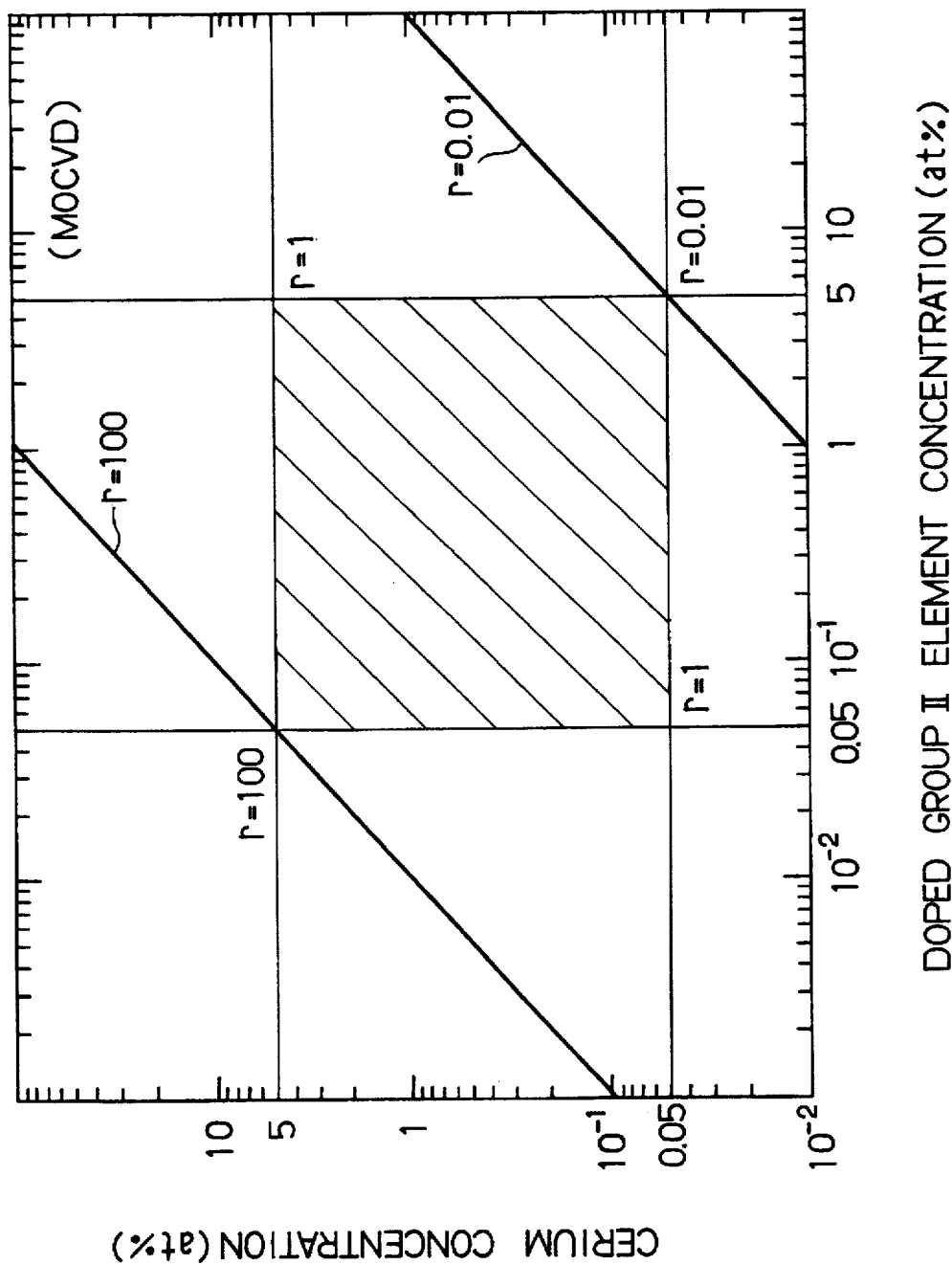
FIG. 6 is a diagram showing a preferred ratio of the added quantity of the luminescent center (Ce) to that of a Group II element added into the host material.

The hatched region in FIG. 6 represents the most preferred region for the quantity of the added elements to the host material.

Although the respective quantities of cerium and magnesium added into the luminescent layer 14 in the present embodiment are controlled by the quantities of the elements added in the target, it can be controlled otherwise by employing multi-component sputtering method, which is a co-sputtering method using plural targets. Specifically, multi-component sputtering method in which cerium and magnesium are supplied separately from other targets different from host material target can be applicable.

[EXAMPLE 2]

The present example relates to a process which comprises forming a cerium(Ce)-doped strontium thiogallate (i.e., SrGa$_2$S$_4$:Ce) luminescent layer 14 by means of evaporation. The other layers, i.e., a first transparent electrode 12, a first insulating layer 13, a second insulating layer 15, and a second transparent electrode 16, are formed in a manner similar to that employed in Example 1.

The luminescent layer 14 is formed by means of an electron beam evaporation method using a pelletized evaporation material. The evaporation material is prepared by heat treating a mixed powder comprising cerium fluoride (CeF$_3$), calcium sulfide (CaS), and barium sulfide (BaS) in strontium thiogallate (SrGa$_2$S$_4$) at 900° C. for a duration of 3.5 hours in gaseous hydrogen sulfide (H$_2$S), and sintering the resulting powder.

Similar to the previous example, in case a heat-treated powder comprising cerium, calcium, and barium in addition to the host material or a sintered pellet of the heat-treated powder is used for the evaporation material, cerium, calcium, and barium can be added efficiently in the luminescent layer 14.

Also similarly to Example 1, the concentration of cerium, calcium, and barium in the luminescent layer 14 is adjusted by controlling the quantity of the added elements in the powder or the pellet.

Then, the as-deposited $SrGa_2S_4$:Ce luminescent layer 14 obtained as an amorphous state is subjected to heat treatment at 650° C. for a duration of 30 minutes to be crystallized.

After the heat treatment, the respective concentrations of cerium, calcium, and barium in the luminescent layer 14 are measured by means of electron probe X-ray microanalyzer (EPMA). Thus, the concentration of cerium was found to be 0.15 atomic percent, whereas calcium and barium were each found to be present at a concentration of 0.10 atomic percent. Accordingly, the ratio of the quantity of the added element acting as the luminescent center to that of the added auxiliary Group II elements each having an ion radius differing from that of the main Group II element constituting the host material, r, i.e., (the quantity of cerium (Ce))/(the quantity of calcium (Ca)+barium(Ba)), is found to be 0.75.

In case of the $SrGa_2S_4$:Ce based EL device thus fabricated in accordance with the present embodiment and pulse-operated under a condition of 1 kHz and 40 µs, it is found to have its luminance improved to three times as high as that of a device into which no calcium nor barium is added.

Although the element acting as a luminescent center and the auxiliary Group II elements having ion radii differing from that of the main Group II element constituting the host material are added into the evaporation material, they may be otherwise supplied by employing multi-component evaporation in which the elements are supplied separately from different supply sources.

[EXAMPLE 3]

The present example relates to a process which comprises forming the luminescent layer 14 by means of metal organic chemical vapor deposition (MOCVD). The other layers, i.e., a first transparent electrode 12, a first insulating layer 13, a second insulating layer 15, and a second transparent electrode 16, are formed in a manner similar to that used in Example 1. Moreover, barium (Ba) is added as an auxiliary Group II element having an ion radius differing from that of a main Group II element constituting the host material.

More specifically, a glass substrate 11 formed thereon the first transparent electrode 12 and the first insulating layer 13 are attached to a susceptor whose speed of rotation is controllable. Then, the entire structure is rotated at a speed of 5 rpm while maintaining the temperature at a constant value of 500° C., and the pressure inside the film deposition chamber is reduced by using a pressure controller.

Then, bisdipivaloylmethanate calcium ($Ca(C_{11}H_{19}O_2)_2$) is introduced into the reaction furnace as a calcium source gas by using argon (Ar) as a carrier gas together with triethyl gallium ($Ga(C_2H_5)_3$) as the gallium source gas by using argon (Ar) as a carrier gas and gaseous hydrogen sulfide ($H_2S$) as the sulfur source. Otherwise, diethylsulfur ($S(C_2H_5)_2$) may be employed as a sulfur source by using gaseous argon as the carrier gas.

A luminescent center can be provided by using tridipivaloylmethanate cerium ($Ce(C_{11}H_{19}O_2)_3$) as the source. Bisdipivaloylmethanate barium ($Ba(C_{11}H_{19}O_2)_2$) is employed as the source for barium. These sources can be introduced into the reaction furnace using argon as the carrier gas. Thus, a cerium-doped calcium thiogallate ($CaGa_2S_4$:Ce) luminescent layer 14 containing barium is formed in this manner.

After the depositing the luminescent layer 14, the concentrations of cerium and barium in the luminescent layer 14 are measured by means of electron probe X-ray microanalyzer (EPMA). Thus, concentration of cerium was found to be 0.25 atomic percent, whereas barium was found to be present at a concentration of 0.15 atomic percent. Accordingly, the ratio of the quantity of the added element acting as the luminescent center to that of the added auxiliary Group II element having an ion radius differing from that of the main Group II element constituting the host material, r, is found to be 1.7.

In case the EL device comprising the luminescent layer 14 of $CaGa_2S_4$:Ce doped with Ba thus fabricated in accordance with the present embodiment is pulse-operated under a condition of 1 kHz and 40 µs, it is found to have its luminance improved to 2.5 times as high as that of a device into which no barium is added.

[EXAMPLE 4]

The present example relates to a process which comprises forming a luminescent layer 14 comprising cerium as the luminescent center in calcium thiogallate host material by means of atomic layer epitaxy (ALE).

On forming the luminescent layer 14, strontium (Sr) and barium (Ba) are added as the auxiliary Group II elements having an ion radius differing from the main Group II element constituting the host material, i.e., calcium. The other layers, i.e., a first transparent electrode 12, a first insulating layer 13, a second insulating layer 15, and a second transparent electrode 16, are formed in a manner similar to that used in Example 1.

More specifically, a glass substrate 11 formed thereon the first transparent electrode 12 and the first insulating layer 13 are attached to a susceptor whose speed of rotation is controllable. Then, the entire structure is rotated at a speed of 5 rpm while maintaining the temperature at a constant value of 500° C., and the film deposition chamber is evacuated by using a pressure controller so that the pressure inside the chamber may be reduced to 5 Torr.

Then, by taking turns, bisdipivaloylmethanate calcium ($Ca(C_{11}H_{19}O_2)_2$) using argon as the carrier gas, triethyl gallium ($Ga(C_2H_5)_3$) using argon as the carrier gas and gaseous hydrogen sulfide ($H_2S$) are introduced into the reaction furnace as a calcium source gas, gallium source gas and a sulfur source, respectively, so that the layers may be formed one by one.

A luminescent center can be provided by using tridipivaloylmethanate cerium ($Ce(C_{11}H_{19}O_2)_3$) as the source. Bisdipivaloylmethanate strontium ($Sr(C_{11}H_{19}O_2)_2$) and bisdipivaloylmethanate barium ($Ba(C_{11}H_{19}O_2)_2$) are the sources for strontium and barium, respectively. These sources are introduced into the reaction furnace using argon as the carrier gas at the same timing as the calcium source gas. Thus, the $CaGa_2S_4$:Ce luminescent layer 14 containing strontium and barium is formed in this manner.

After the depositing the luminescent layer 14, the concentrations of cerium, strontium, and barium in the luminescent layer 14 are measured by means of electron probe X-ray microanalyzer (EPMA). The concentration of cerium was found to be 0.20 atomic percent, whereas strontium and barium were found to be present at a concentration of 0.10 atomic percent each. Accordingly, the ratio of the quantity of the added element acting as the luminescent center to that of the added auxiliary Group II elements having an ion radius differing from that of the main Group II element constituting the host material, r, is found to be 1.0.

In case the EL device comprising $CaGa_2S_4$:Ce doped with Sr and Ba thus fabricated in accordance with the present embodiment is pulse-operated under a condition of 1 kHz and 40 µs, it is found to have its luminance improved to three times as high as that of a device into which no barium nor strontium is added.

While the present invention has been shown and described with reference to the foregoing preferred embodiments, it will be apparent to those skilled in the art that changes in form and detail may be made therein without departing from the scope of the invention as defined in the appended claims. For example, europium (Eu) can be applicable as a luminescent center element in lieu of cerium (Ce).

What is claimed is:

1. An electroluminescent device comprising sequentially stacked layers having an optically transparent material on at least a viewing side thereof, said electroluminescent device comprising a luminescent layer based on a Group II-III-VI compound host material with an element acting as a luminescent center added therein, said luminescent layer further containing an auxiliary Group II element having an ion radius differing from that of a main Group II element constituting said Group II-III-VI compound host material.

2. An electroluminescent device as claimed in claim 1, wherein said auxiliary Group II element accounts for 0.01 or more but 10 or less atomic percent with respect to said main Group II element.

3. An electroluminescent device as claimed in claim 2, wherein said auxiliary Group II element accounts for 0.01 or more but 5 or less atomic percent with respect to said main Group II element.

4. An electroluminescent device as claimed in claim 3, wherein said auxiliary Group II element accounts for 0.05 or more but 5 or less atomic percent with respect to said main Group II element.

5. An electroluminescent device as claimed in claim 1, wherein a ratio of a quantity of said element acting as said luminescent center to a quantity of said auxiliary Group II element is 0.01 or more but 100 or less.

6. An electroluminescent device as claimed in claim 1, wherein said Group II-III-VI compound host material is an alkaline earth thiogallate selected from the group consisting of calcium thiogallate ($CaGa_2S_4$), strontium thiogallate ($SrGa_2S_4$), and barium thiogallate ($BaGa_2S_4$).

7. An electroluminescent device as claimed in claim 1, wherein said auxiliary Group II element is one or more selected from the group consisting of magnesium (Mg), calcium (Ca), strontium (Sr), and barium (Ba).

8. An electroluminescent device as claimed in claim 1, wherein said luminescent layer is based on calcium thiogallate ($CaGa_2S_4$) with said element acting as said luminescent center added therein, and said auxiliary Group II element is one or more selected from the group consisting of magnesium (Mg), strontium (Sr), and barium (Ba).

9. An electroluminescent device as claimed in claim 1, wherein said luminescent layer is based on strontium thiogallate ($SrGa_2S_4$) with said element acting as said luminescent center added therein, and said auxiliary Group II element is one or more selected from the group consisting of magnesium (Mg), calcium (Ca), and barium (Ba).

10. An electroluminescent device as claimed in claim 1, wherein said element acting as said luminescent center is cerium (Ce) or europium (Eu).

* * * * *